April 12, 1966 R. A. KAENEL 3,246,314

ANALOG-TO-DIGITAL CONVERTER

Filed Jan. 17, 1962 3 Sheets-Sheet 1

INVENTOR
R. A. KAENEL
BY Lucian C. Canepa
ATTORNEY

April 12, 1966 R. A. KAENEL 3,246,314

ANALOG-TO-DIGITAL CONVERTER

Filed Jan. 17, 1962 3 Sheets-Sheet 2

INVENTOR
R. A. KAENEL
BY Lucian C. Canepa
ATTORNEY

INVENTOR
R. A. KAENEL
BY Lucian C. Canepa
ATTORNEY

United States Patent Office 3,246,314
Patented Apr. 12, 1966

3,246,314
ANALOG-TO-DIGITAL CONVERTER
Reginald A. Kaenel, Murray Hill, N.J., assignor to Bell Telephone Laboratories, Incorporated, New York, N.Y., a corporation of New York
Filed Jan. 17, 1962, Ser. No. 166,830
16 Claims. (Cl. 340—347)

This invention relates to the processing of electrical information signals, and more particularly to an analog-to-digital converter.

In processing electrical information signals, it is often required that instantaneous values of continuously variable quantities be converted to discrete numerical form. For example, it is often required that data derived from a physical system be delivered directly to a digital computer for processing. Such data would normally appear in analog form. In such cases and in various other situations in which information in the form of analog signals is to be processed, the need arises to convert the analog signals into digital representations.

An object of the present invention is to improve information processing systems.

More specifically, an object of this invention is an improved analog-to-digital converter.

A further object of the present invention is an analog-to-digital converter which is characterized by extreme simplicity of design, high speed, low power consumption and high reliability.

These and other objects of the present invention are realized in a specific illustrative embodiment thereof that includes $n$ stages interconnected in a linear array, each stage comprising a common-emitter transistor amplifier having a voltage-controlled negative resistance diode connected to the emitter electrode thereof. The collector electrode of each transistor is coupled to the base of the next following transistor in the array and each stage is adjusted to have a voltage gain of two. The input analog signal to be converted is applied to the base electrode of the transistor in the first stage, and threshold detectors respectively connected to the diodes of the embodiment provide a digital representation of the input analog signal at any specified instant of time.

Quiescently, each diode is biased at a low current operating point on the relatively low voltage positive resistance region of its voltage-current characteristic curve. For any input analog signal voltage whose value is between a reference voltage level and a maximum voltage V, there is provided by the threshold detectors a corresponding digital representation of the input signal. The difference between the reference voltage and the maximum value V approximates the voltage that is necessary to drive the diode in the first stage of the converter from its quiescent operating point to the valley point of its characteristic curve. Because the first stage, and, as noted above, each stage, exhibits a voltage gain of two, any voltage change $\Delta E$ applied to the first stage appears as a change $2\Delta E$ at the input to the second stage, as a change $4\Delta E$ at the input to the third stage, and so forth.

As a result, each of $2^n$ discrete ranges of the permissible input analog voltage variation is represented by a unique condition of the $n$ diodes and, in turn, by a unique digital indication of the threshold detectors. In fact, as the input analog signal is linearly varied from its reference voltage level to the maximum voltage V, the digital representations of the threshold detectors form a Gray code binary sequence.

It is a feature of the present invention that an analog-to-digital converter include $n$ interconnected stages arranged in a linear array, each stage comprising an amplifier having a voltage gain of two and having a voltage-controlled negative resistance diode connected in a circuit therewith.

It is a further feature of this invention that the amplifier in each stage of the converter be a common-emitter transistor amplifier and that the voltage-controlled negative resistance diode associated therewith be connected to the emitter electrode thereof.

It is a still further feature of the present invention that each diode of the converter be biased initially at a low current point on the relatively low voltage positive resistance region of its characteristic curve.

Still another feature of this invention is that the converter include a plurality of threshold detectors respectively responsive to the voltages appearing across the diodes.

A complete understanding of the present invention and of the above and other features and advantages thereof may be gained from a consideration of the following detailed description of an illustrative embodiment thereof presented hereinbelow in connection with the accompanying drawing, in which.

Figure 1:
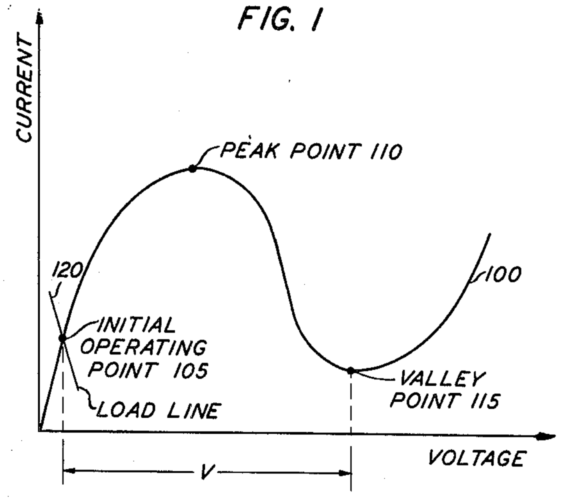
FIG. 1 depicts the voltage-current characteristic curve of a negative resistance diode of the type included in each stage of an illustrative analog-to-digital converter which embodies the principles of the present invention.

Illustrative embodiments of the principles of the present invention include negative resistance diodes of the voltage-controlled type, the voltage-current characteristic curve 100 of such a diode being depicted in FIG. 1. One highly advantageous example of this type of two-terminal negative resistance arrangement is the so-called tunnel diode. Tunnel diodes are described in the literature: see, for example, "New Phenomenon in Narrow Germanium P-N Junctions," L. Esaki, Physical Review, volume 109, January–March 1958, pages 603–604; "Tunnel Diodes as High-Frequency Devices," H. S. Sommers, Jr., Proceedings of the Institute of Radio Engineers, volume 47, July 1959, pages 1201–1206; and "High-Frequency Negative-Resistance Circuit Principles for Esaki Diode Applications," M. E. Hines, The Bell System Technical Journal, volume 39, May 1960, pages 477–513.

The tunnel diode offers many physical and electrical advantages over other two-terminal negative resistance arrangements. These advantages include: potentially low cost, environmental ruggedness, reliability, low power dissipation, high frequency capability, and low noise properties. Advantageously, then, the negative resistance diodes included in illustrative embodiments of the principles of the present invention are tunnel diodes.

Advantageously, each of the negative resistance diodes included in an illustrative embodiment of the principles of the present invention is biased initially at a low current point 105 on the relatively low voltage positive resistance region of the curve 100 depicted in FIG. 1. It is noted that the current value corresponding to the initial operating point 105 approximates the current value associated with the valley point 115. The application of a linearly increasing input voltage signal of maximum amplitude V to such a diode causes the operating point thereof to move upward on the curve 100 from the initial point 105 to the peak point 110 and then downward to the valley point 115 thereof. In so moving, the operating point of the diode describes a path which will hereinafter, in the interest of simplicity and clarity of presentation, be approximated by two straight line segments, one segment connecting the initial point 105 to the peak point 110 and the other connecting the peak point to the valley 115. Additionally, it will be assumed herein that the absolute values of the slopes of the two noted straight line segments are equal, although as is described below, the slope of the load line 120 shown in FIG. 1 may be selected to compensate for the fact that the slopes of the two segments may in fact differ.

Figure 2A:
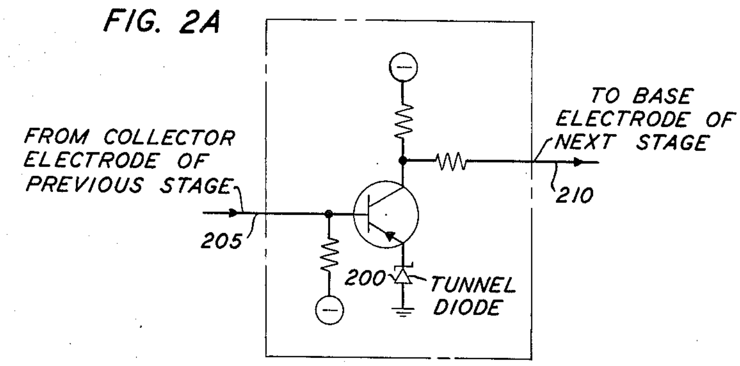
FIG. 2A is a schematic showing of the basic building block circuit from which may be constructed an illustrative converter of the type disclosed herein.

Referring now to FIG. 2A, there is shown the basic building block circuit from which may be constructed an illustrative analog-to-digital converter made in accordance with the principles of the present invention. Essentially, the basic circuit comprises a linear transistor amplifier having a negative resistance diode 200 directly connected to the emitter electrode of the transistor. Because the diode 200 is connected in series in the emitter-to-collector or output path of the depicted transistor amplifier, the output voltage waveform of the basic circuit is a replica of the current waveform of the diode 200. The amplifier is adjusted to have a voltage gain of two. That is, the amplifier is adjusted so that any voltage change $\Delta E$ applied to input lead 205 appears as a change $2\Delta E$ on output lead 210.

Figure 2B:
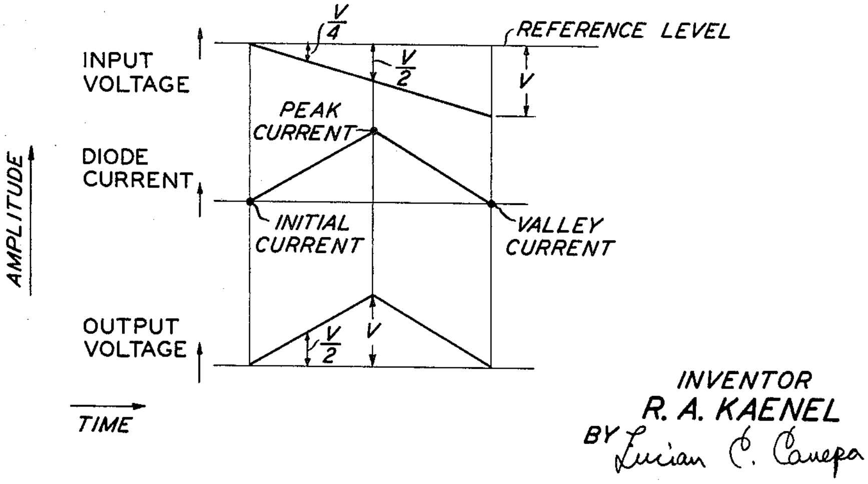
FIG. 2B shows various waveforms which are characteristic of the circuit illustrated in FIG. 2A.

Assume that an input voltage signal of the type represented by the uppermost waveform of FIG. 2B is applied to the lead 205 of the basic circuit shown in FIG. 2A. In response thereto the current through the diode 200 varies in approximate accordance with the middle waveform of FIG. 2B and, as a result, the output voltage signal appearing on the lead 210 of the FIG. 2A circuit is of the type represented by the bottommost waveform of FIG. 2B.

It is noted from FIG. 2B that the input voltage applied to the lead 205 of FIG 2A need increase (in a negative direction) only from the reference level value to $V/2$ to cause the output voltage of the circuit to change in value by V volts. Similarly, if a second basic circuit having a voltage gain of two is connected to the output lead 210 of the circuit shown in FIG. 2A, it is apparent that a voltage change of $V/4$ applied to the input lead 205 produces a voltage change of V volts on the output lead of the second circuit.

Figure 3:
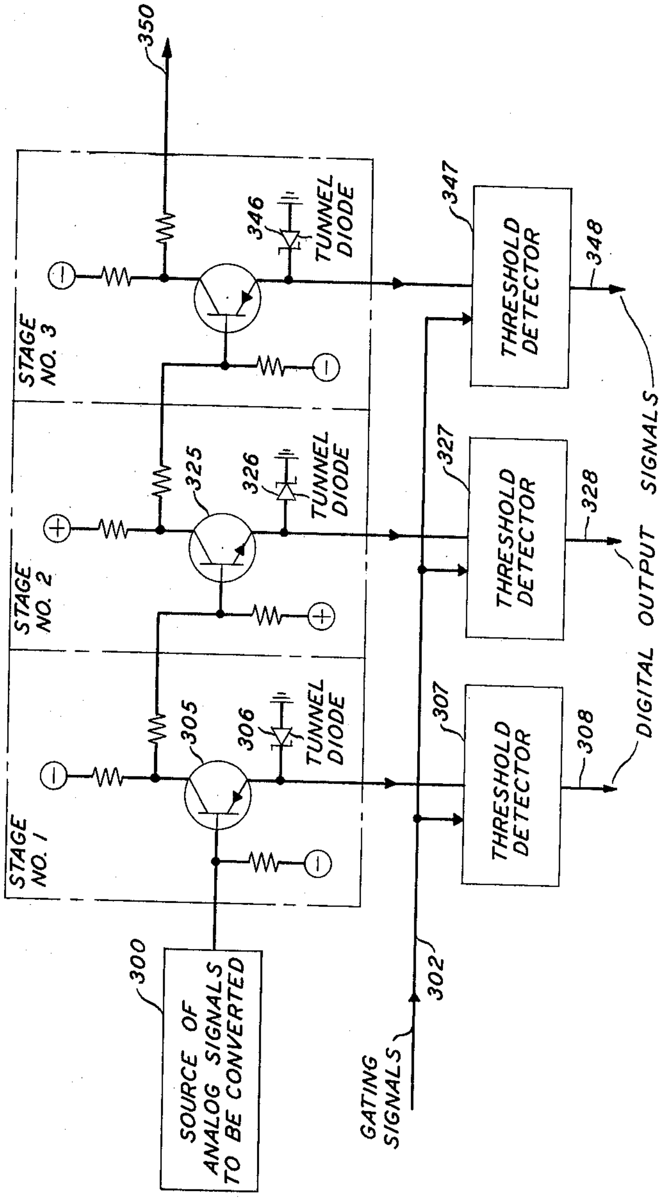
FIG. 3 is a schematic representation of a specific illustrative 3-stage converter made in accordance with the principles of this invention.

Assume now that three circuits of the general type of the one shown in FIG. 2A are interconnected, in the manner depicted in FIG. 3, to form a part of a specific illustrative analog-to-digital converter made in accordance with the principles of the present invention. It is noted that stages 1 and 3 of the illustrative converter are each identical to the basic circuit of FIG. 2A and that stage No. 2 differs therefrom only in that the transistor type, the polarities of the bias sources, and the poling of the negative resistance diode thereof are respectively opposite to those of the basic circuit. A source 300 supplies to the base electrode of transistor 305 in stage No. 1 analog signals which are to be converted. As indicated above, each stage includes a negative resistance diode. Connected to the diodes 306, 326 and 346 are threshold detectors 307, 327 and 347, respectively, each of which may, for example, comprise a conventional Schmitt trigger circuit or a well-known bistable tunnel diode circuit. In any event each detector includes a bistable arrangement which is adjusted to respond to voltages less than that corresponding to the peak point of its associated diode by switching to or remaining in a first stable state representative of the binary value "0," and which responds to greater voltages by switching to or remaining in a second stable state representative of the binary value "1." Illustratively, signals representative of the states of the detectors 307, 327 and 347 may be periodically applied to output leads 308, 328 and 348 by gating signals appearing on lead 302. In this way the representations of the detectors are sampled at predetermined instants of time to provide digital output signals respectively indicative of the analog signals supplied from the source 300 at those instants.

Figure 4:
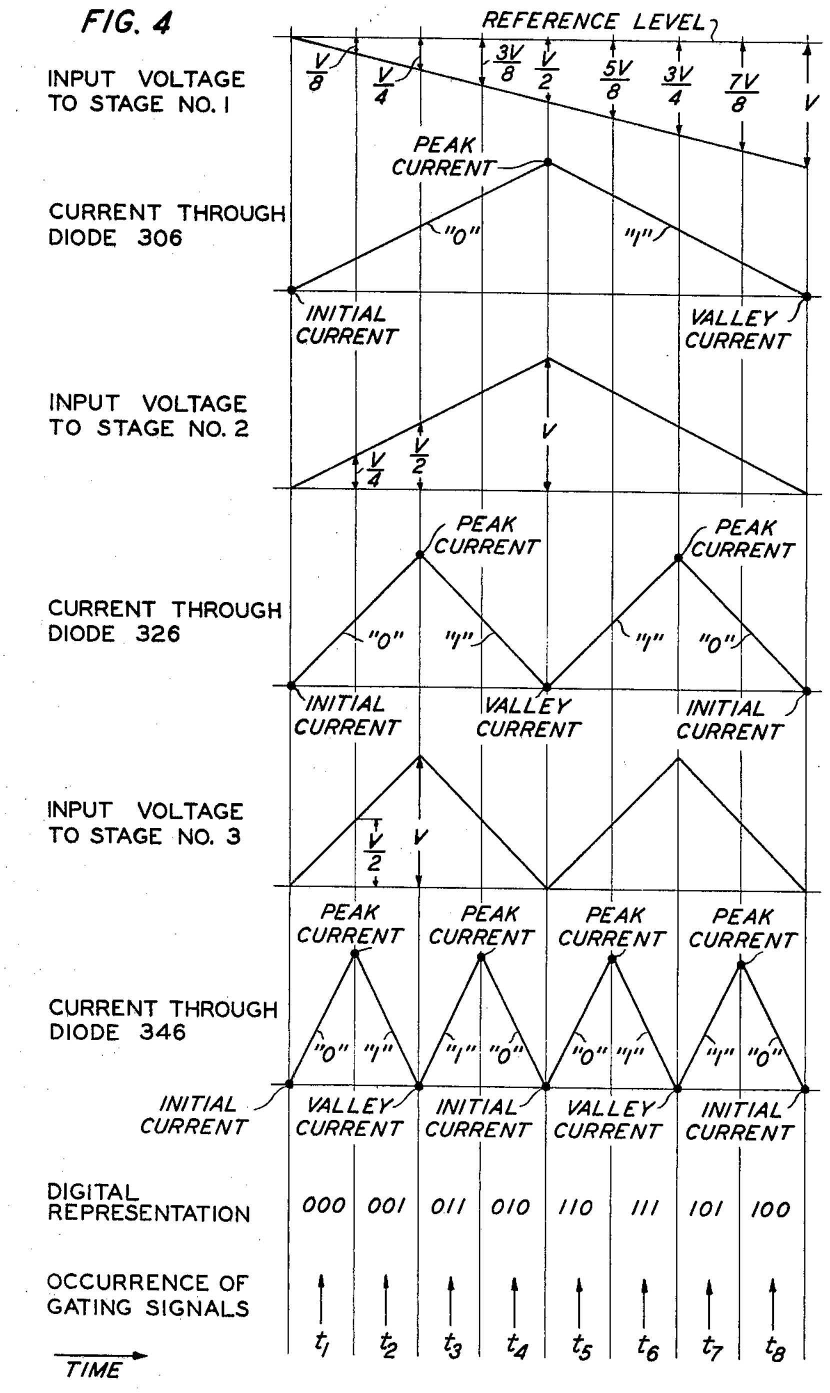
FIG. 4 depicts various waveforms which are characteristic of the illustrative converter shown in FIG. 3.

The waveforms shown in FIG. 4 are helpful in understanding the operation of the specific converter depicted in FIG. 3. For illustrative purposes it will be assumed that the source 300 applies to the base of the transistor 305 in stage No. 1 a voltage which steadily increases in value from a reference level to V volts. It is significant to remember that V volts corresponds to the difference between the voltage values respectively associated with the initial and valley points of the negative resistance diode included in each stage of the converter, and that $V/2$ volts corresponds to the difference between the voltage values respectively associated with the initial and peak points or with the peak and valley points.

As the voltage applied to the first stage of the converter shown in FIG. 3 increases from the reference level to $V/8$ volts, the voltage applied to the base of the transistor 325 in stage No. 2 increases by $V/4$, as graphically depicted in FIG. 4. In turn, the increase of $V/4$ volts applied to stage No. 2 causes the output voltage thereof to change by $V/2$ volts, which is sufficient to drive the operating point of the diode 346 in stage No. 3 from the initial point on its characteristic curve to the peak point thereof, as represented by a portion of the bottommost waveform of FIG. 4. Thus, for any voltage value less than $V/8$, each of the diodes 306, 326 and 346 operates at a point below the peak point thereof and, consequently, the threshold detectors 307, 327 and 347 are representative of the binary word 000 which may, for example, be gated from the detectors at time $t_1$, as indicated in FIG. 4.

As the voltage applied to the first stage of the converter shown in FIG. 3 increases from $V/8$ volts toward a value of $V/4$, the current through the diode 346 in stage No. 3 decreases from its maximum or peak value toward the valley current value thereof. Accordingly, the application to the theshold detectors 307, 327 and 347 of a gating signal at time $t_2$ causes the binary word 001 to be supplied to the output leads 308, 328 and 348.

Subsequently, as the voltage applied to the first stage of the illustrative converter increases from $V/4$ volts toward a value of $3V/8$ volts, the current through the diode 326 in stage No. 2 decreases from its peak value toward its valley value. This in turn causes the output voltage of stage No. 2 to decrease. As a result the driving voltage applied to stage No. 3 decreases and the current through the diode 346 therein increases from the valley value toward the peak value thereof.

Hence, if at time $t_3$ the conditions of the negative resistance diodes 306, 326 and 346 are sensed by the threshold detectors 307, 327 and 347, respectively, the binary word 011 is supplied to the output leads 308, 328 and 348.

In a manner similar to that set forth in detail above, the operation of the illustrative analog-to-digital converter shown in FIG. 3 may be easily shown to follow the mode graphically depicted in FIG. 4. As shown there the permissible amplitude variation of the input voltage is divided into eight ranges with which is associated the Gray code binary sequence 000, 001, 011, 010, 110, 111, 101, 100. Accordingly, if a continuously variable analog signal, for example, a speech signal, is applied to the base of the transistor 305 in stage No. 1 and if a gating signal is applied to the threshold detectors 307, 327 and 347 at a time at which the analog signal has a level between, say, $5V/8$ and $3V/4$, the signals applied to the output leads 308, 328 and 348 will be representative of the binary word 111, as indicated in FIG. 4. In this way, analog signals supplied by the source 300 are converted into corresponding digital indications which appear at predetermined gating instants on the output leads 308, 328 and 348.

It was assumed above that the absolute value of the resistance represented by the straight line segment connecting the initial operating point of one of the diodes to the peak point thereof equals the absolute value of the resistance represented by the straight line segment interconnecting the peak and valley points thereof. In this case a given voltage change applied to a diode whose effective load resistor is very small produces the same current change therethrough whether the operating region of the diode is below or above its peak point. If, on the other hand, the resistance $r_2$ represented by the line interconnecting the peak and valley points of the diode is in fact greater than the resistance $r_1$ represented by the line interconnecting the initial and peak points, the effective load for such a diode should advantageously be selected to satisfy the relationship $$\frac{|r_2|-|r_1|}{2}$$

thereby to enhance the linearity of the overall characteristics of a converter made in accordance with the principles of the present invention.

Although emphasis herein has been directed to a 3-stage analog-to-digital converter made in accordance with the principles of the present invention, it is to be understood that these principles extend to $n$-stage converters. In this respect it is noted that stage No. 3 of the specific converter depicted in FIG. 3 includes an output lead 350 to which may be connected another stage. This additional stage would be of the same form as stage No. 2. Further stages may be added to form an $n$-stage converter. In such a converter the even-numbered stages are identical to each other and, similarly, the odd-numbered stages are identical, each being of the form of the basic circuit shown in FIG. 2A.

A converter of the type shown in FIG. 3 may be still further simplified by recognizing that the last or right-hand stage thereof need not include an amplifier, it being only necessary that that stage include a voltage-controlled negative resistance diode driven by the next to the last stage, from which diode an output may be derived.

It is emphasized that although particular attention herein has been directed to the use of a tunnel diode as the negative resistance element of each stage of the specific illustrative converter disclosed herein, other two-terminal voltage-controlled negative resistance arrangements having characteristics of the type shown in FIG. 1 may be substituted therefor.

Furthermore, it is to be understood that the above-described arrangements are only illustrative of the application of the principles of the present invention. Numerous other arrangements may be devised by those skilled in the art without departing from the spirit and scope of this invention.

What is claimed is:

1. In combination in a system for converting an analog signal into a digital representation thereof, a plurality of amplifying stages interconnected in a linear array, means for applying the analog signal to be converted only to the first stage of said array, means for biasing each stage such that the stage exhibits a voltage gain of two in a region of linear amplifying operation, and means comprising a voltage-controlled negative resistance diode for controlling the waveform of the output voltage from each stage.

2. A combination as in claim 1 wherein each stage comprises a linear common-emitter transistor amplifier having base, emitter and collector electrodes.

3. A combination as in claim 2 wherein the diode in each stage is directly connected to the emitter electrode of the transistor amplifier therein.

4. A combination as in claim 3 wherein the diode in each stage is a tunnel diode.

5. A combination as in claim 4 wherein each stage includes means for initially biasing the diode therein to a low current point on the relatively low voltage positive resistance region of its voltage-current characteristic curve.

6. A combination as in claim 5 wherein a plurality of threshold dectectors are respectively connected to the diodes in said stages for sensing the voltage conditions thereof, each detector providing a "0" signal indication if the voltage appearing across its associated diode is less than that corresponding to the peak point thereof and a "1" signal indication if the voltage across its associated diode is greater than that corresponding to the peak point thereof.

7. A combination as in claim 6 including means connecting the collector electrode of one stage to the base electrode of the next following stage.

8. A combination as in claim 7 wherein said means for applying the analog signal to be converted to the first stage includes means for applying said signal to the base electrode of the transistor in the first stage.

9. A combination as in claim 8 wherein the transistors in the odd-numbered stages of the array are of one conductivity type and those in the even-numbered stages are of the opposite type.

10. In combination in a system for converting an input analog signal into a digital representation thereof, a plurality of stages arranged in a linear array, each stage including an amplifier characterized by a voltage gain of two, each amplifier comprising a common-emitter transistor having base, emitter and collector circuits, each amplifier further including a voltage-controlled negative resistance diode connected in the emitter circuit of the transistor in said stage, means interconnecting the collector circuit of the transistor of one stage to the base circuit of the transistor in the next following stage, means for applying the input analog signal only to the base circuit of the transistor in the first stage of said array, and means responsive to the voltage conditions of said diodes for providing a digital representation of the applied input signal.

11. In combination in a system for converting an analog signal whose amplitude continuously varies between a reference level and V volts into an $n$-digit representation thereof, $n$ amplifying stages arranged in a linear array, each stage having input and output terminals and being characterized by a voltage gain of two, each stage including a voltage-controlled negative resistance diode for controlling the waveform of the input voltage thereof, means for quiescently biasing each of said diodes to an initial low current point on the relatively low voltage positive resistance region of its voltage-current characteristic curve, V volts being required to shift the initial point to the valley point of the characteristic, means for sensing the voltage conditions of said diodes, means connecting the output terminal of one stage to the input terminal of the next following stage and of the array, and means for applying the input analog signal to be converted only to the input terminal of the first stage of the array.

12. In combination, a common-emitter transistor having base, emitter and collector electrodes, means connected to said base and collector electrodes for biasing said transistor for linear amplifying operation and to exhibit a voltage gain of two, and only one voltage-controlled negative resistance diode connected between said emitter electrode and a point of constant references potential for controlling the output voltage waveform from said transistor.

13. A combination as in claim 12 further comprising means for initially biasing said diode to a low current operating point on the relatively low voltage positive resistance region of its voltage-current characteristic curve.

14. A combination as in claim 13 further comprising means connected to the base electrode of said amplifier for causing the operating point of said diode to move within a voltage range bounded by the voltage values respectively associated with the initial and valley points of said diode.

15. A combination as in claim 14 further comprising threshold detecting means connected to said diode for sensing the voltage condition thereof.

16. In combination, a linear amplifier having a voltage gain of two, and means including only one voltage-controlled negative resistance diode connected between said amplifier and a point of constant reference potential for controlling the output voltage waveform from said amplifier.

References Cited by the Examiner

UNITED STATES PATENTS

| | | | |
|---|---|---|---|
| 2,869,079 | 1/1959 | Staffin | 340—347 X |
| 3,021,517 | 2/1962 | Kaenel | 340—347 |
| 3,054,911 | 9/1962 | Buelow | 307—88.5 |

OTHER REFERENCES

Lettieri: "Analog to Digital Converter," IBM Technical Disclosure Bulletin, vol. 3, No. 9, February 1961, pp. 43–45.

Chagois: "Analog to Digital Converter," IBM Technical Disclosure Bulletin, vol. 3, No. 10, March 1961, pp. 130–131.

MALCOLM A. MORRISON, *Primary Examiner.*